Figure 1:
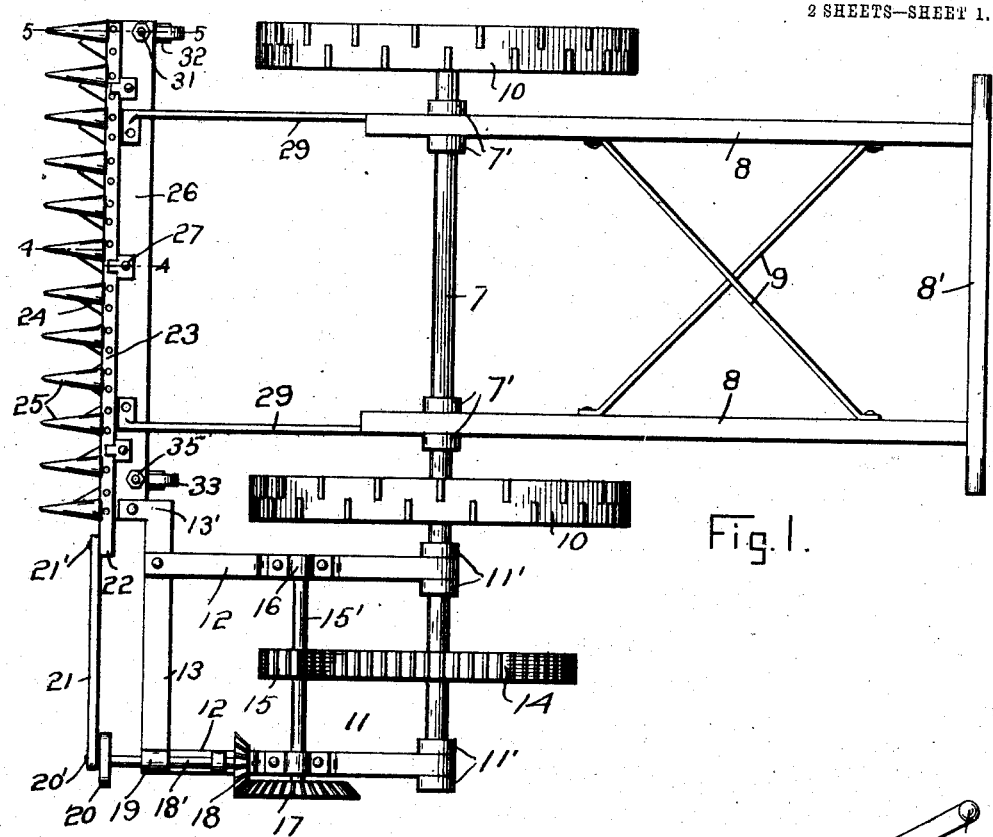

No. 864,380. PATENTED AUG. 27, 1907.
F. KIERZEK.
MOWER.
APPLICATION FILED DEC. 28, 1906.

2 SHEETS—SHEET 1.

Witnesses
C. K. Reichenbach.
H. C. McCartney

Inventor
F. Kierzek
By Chandler & Chandler
Attorneys

No. 864,380.
PATENTED AUG. 27, 1907.
F. KIERZEK.
MOWER.
APPLICATION FILED DEC. 28, 1906.
2 SHEETS—SHEET 2.
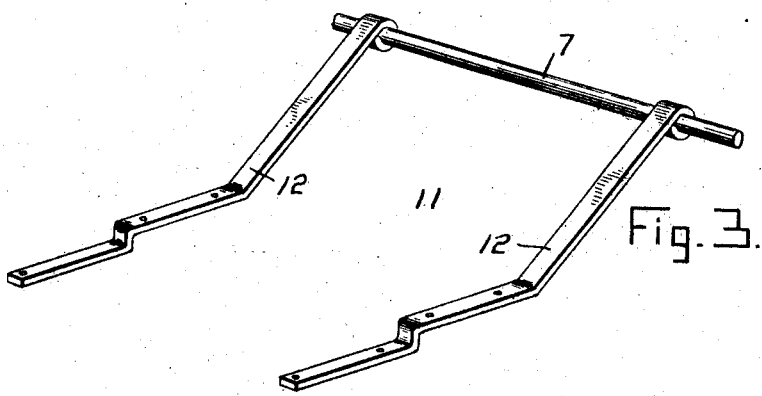
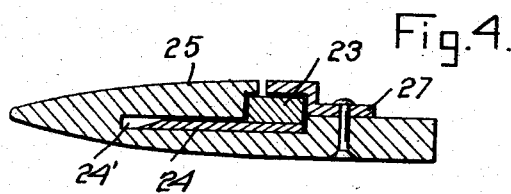
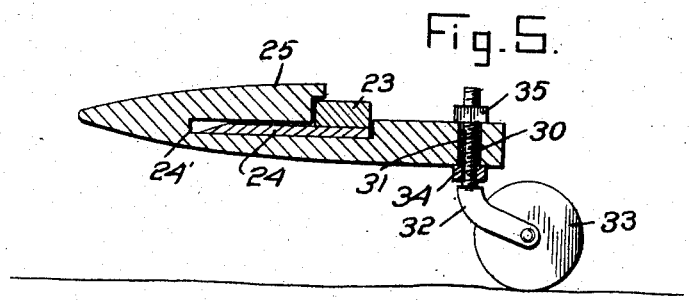

UNITED STATES PATENT OFFICE.

FRANK KIERZEK, OF ARGYLE, MINNESOTA.

MOWER.

No. 864,380.  Specification of Letters Patent.  Patented Aug. 27, 1907.

Application filed December 28, 1906. Serial No. 349,846.

*To all whom it may concern:*

Be it known that I, FRANK KIERZEK, a citizen of the United States, residing at Argyle, in the county of Marshall, State of Minnesota, have invented certain new and useful Improvements in Mowers; and I do hereby declare the following to be a full, clear, and exact description of the invention, such as will enable others skilled in the art to which it appertains to make and use the same.

The present invention relates to mowing machines, and has for its object to provide an improved supporting frame for the driving mechanism by which the reciprocating cutter is operated.

A further object consists in the provision of improved means for supporting the finger-bar across which the cutter bar moves, to regulate the distance of the entire cutting mechanism from the ground and enable the mower to operate in grass of any length.

The invention further consists in the combination, construction, and arrangement of parts, all as hereinafter fully described, specifically claimed, and illustrated in the accompanying drawings, in which like parts are designated by corresponding reference numerals in the several views.

Figure 2:
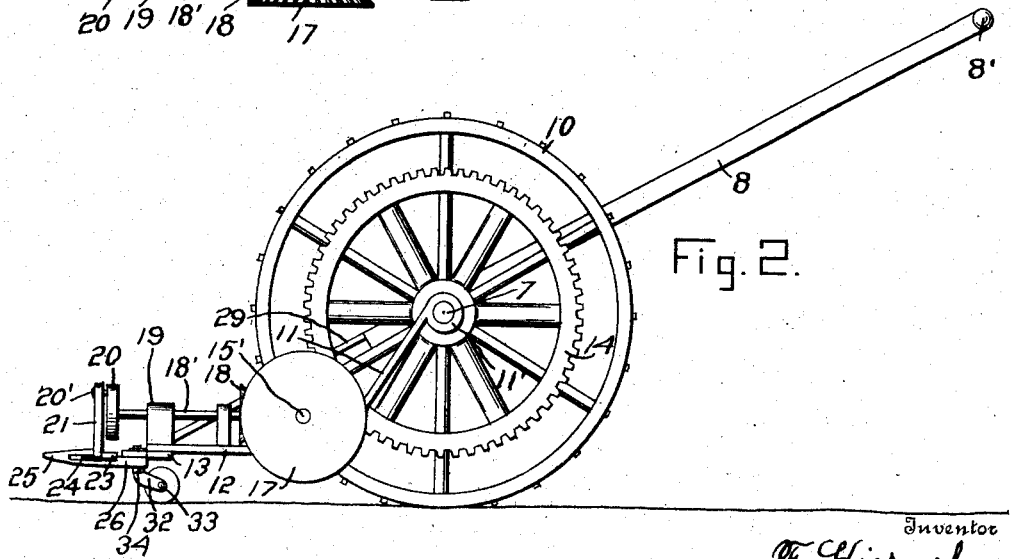

Of the said drawings—Figure 1 is a top plan view of the improved mower. Fig. 2 is a side elevation. Fig. 3 is a detail view of the frame for the driving mechanism. Fig. 4 is a sectional view taken on the line 4—4 of Fig. 1. Fig. 5 is an enlarged sectional view on the line 5—5 of Fig. 1, showing one of the supporting sleeves for the finger-bar and the sleeve carried thereby.

Referring more particularly to the drawings, 7 designates the axle of the machine upon which is loosely mounted a pair of rearwardly-extending bars 8, whose opposite ends are connected by the handle bar 8′, the bars being further connected by a pair of intersecting braces 9. To prevent lateral movement of the bars upon the axle, the latter carries a pair of collars 7′ arranged adjacent the opposite faces of each handle.

The usual spurred traction wheels 10 are mounted upon the axle exteriorly of the handles 8, and, as shown in Fig. 1, one end of the axle extends some distance beyond the corresponding traction wheel and carries an open frame generally designated 11, in which the driving mechanism for actuating the cutter-bar is mounted. This frame 11, as shown, comprises a pair of metal straps 12, which are loosely mounted at their rear ends upon the projecting axle end, and are connected at their opposite end by a strap 13, the straps 12 being retained upon the axle by collars 11′, similar to the collars 7′.

Mounted on the axle between the straps 12 is a gear wheel 14, in mesh with a smaller gear 15 mounted on a shaft 15′ disposed transversely of said straps and carried in brackets 16 secured to said straps, the outer end of said shaft extending beyond the corresponding strap 12 and carrying a beveled gear 17, in mesh with a smaller gear 18 fast on the rear end of a shaft 18′, arranged longitudinally of its strap and mounted within a bracket 19 at the front end thereof. The opposite end of the shaft 18′ carries a crank disk 20, whose pin 20′ is connected with one end of a pitman 21, whose opposite end carries a pin 21′ connected with the projecting end 22 of the cutter-bar 23. The cutter bar is of the usual construction and carries the knives 24 which move transversely through the slots 24′ in the fingers 25 of the finger-bar 26, which latter has secured thereto a series of plates 27, each provided with a forwardly-extending section which extends across the upper face of the cutter-bar, to retain the latter in place.

The front end of each bar 8 carries a forwardly extending brace 29 bolted at its rear end to the adjacent handle end and having its front end bent at right-angles and secured to the finger-bar 26 to support the cutting mechanism as a whole.

From the foregoing, it will be obvious that upon forward movement of the machine the cutter-bar will be reciprocated through its pitman and crank-disk connection with the shaft 18′, whose rotation is effected from the axle 7 through the gears 14, 15, 17 and 18, the slotted fingers of the bar 26 coöperating with the knives of the cutter-plate in the usual manner.

In order to adapt the machine for cutting different lengths of grass, the finger-bar is provided at each end with an opening 30 through which extends loosely the threaded stem 31 of a yoke or bracket 32, carrying a wheel 33. Movable upon the stem of each bracket is an interiorly threaded sleeve 34, which is adapted to bear against the under face of the finger-bar, so that the latter may be raised or lowered on the yoke-stem as desired, thus adjusting the distance of the cutting mechanism from the ground. The free end of each yoke-stem carries a nut 35, which is adapted to bear against the outer face of the finger-bar to retain the latter in its adjusted position. It will thus be apparent that the cutting mechanism may be adjusted to operate at any desired distance from the ground to regulate the length to which the grass is cut, and it will be further apparent that during the adjustment of the cutting mechanism the frame 11, which carries the drive mechanism for the latter, will have a corresponding pivotal movement upon the axle 7, owing to the strap connection 13′ between the front end of the inner frame member 12 and the adjacent end of the finger-bar.

It is not intended that the invention be limited to the exact details of construction shown and described, as modifications and changes may obviously be made within the scope of the appended claims.

What I claim, is—

1. A mowing machine comprising, in combination with an axle and traction wheels carried thereby; a pair of rearwardly extending bars secured to the axle; a handle bar connecting said bars, cutting mechanism secured to said bars and including a finger-bar, and a cutter-bar adapted to be reciprocated thereover; an open frame loosely mounted on said axle at one end thereof; and driving mechanism disposed within said frame and connected with the cutter-bar for actuating the same, said driving mechanism being operated by the rotation of said axle.

2. A mowing machine comprising, in combination with an axle and traction wheels carried thereby; a pair of rearwardly extending bars secured to the axle; a handle bar connecting said bars, cutting mechanism secured to said bars and including a finger-bar, and a cutter-bar adapted to be reciprocated thereover; a pair of straps loosely mounted at their rear ends upon one end of said axle exteriorly of the adjacent traction wheel, and arranged in spaced relation to each other; a gear mounted on said axle between said straps; a shaft mounted transversely on said straps, in front of said axle; a gear carried by said transverse shaft between said straps and arranged to mesh with the first-mentioned gear; a gear mounted on the outer end of said transverse shaft; a longitudinally disposed shaft mounted on one of the straps; a gear mounted on the rear end of said longitudinal shaft in mesh with said last-mentioned gear; and driving connections between the opposite end of said longitudinal shaft and said cutter-bar for actuating said cutter-bar.

3. The combination, in a mowing machine, of an axle and traction wheels mounted thereon; a pair of rearwardly extending bars mounted upon said axle; a handle bar connecting said bars; cutting mechanism secured to said bars and comprising a finger-bar and a cutter-bar adapted to be reciprocated thereover; a frame loosely mounted on said axle at one end thereof and connected with said finger-bar; driving mechanism carried by said frame and connected with said cutter-bar for actuating the same; and means connected with said finger-bar for bodily raising or lowering said cutting mechanism.

4. The combination, in a mowing machine, of an axle and traction wheels mounted thereon; a pair of rearwardly extending bars mounted upon said axle; a handle bar connecting said bars; cutting mechanism secured to said bars and comprising a finger-bar having an opening formed therethrough at each end, and a cutter-bar adapted to be reciprocated thereover; a frame loosely mounted on said axle exteriorly of one of said traction wheels; driving mechanism carried by said frame and connected with said cutter-bar for actuating the same, said driving mechanism being operated by the rotation of the axle; a yoke disposed at each end of said finger-bar and including a threaded stem passing through the corresponding opening therein; a wheel rotatably mounted in each yoke; an interiorly threaded sleeve movable upon the stem of each yoke and adapted to bear at its upper end against the under face of said finger-bar for adjusting the position of the latter towards and from the ground; and a nut mounted upon the free end of each yoke stem and adapted to be moved into engagement with the upper face of said finger-bar to retain the same in adjusted position.

In testimony whereof, I affix my signature, in presence of two witnesses.

FRANK KIERZEK.

Witnesses:
 PETER KIRSCH,
 ANTON PAWTOSKI.